United States Patent
Williams et al.

(10) Patent No.: US 7,278,070 B2
(45) Date of Patent: Oct. 2, 2007

(54) INTERLEAVING TO AVOID WIDEBAND INTERFERENCE IN A MULTI-CARRIER COMMUNICATIONS SYSTEM

(75) Inventors: Richard Williams, San Diego, CA (US); Srikanth Gummadi, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1021 days.

(21) Appl. No.: 09/952,428

(22) Filed: Sep. 14, 2001

(65) Prior Publication Data

US 2003/0053410 A1 Mar. 20, 2003

(51) Int. Cl.
*G06F 11/00* (2006.01)

(52) U.S. Cl. ................ 714/701; 714/796
(58) Field of Classification Search ......... 714/701, 714/54, 42, 789, 796, 800; 370/208, 209, 370/318, 342, 346
See application file for complete search history.

(56) References Cited

U.S. PATENT DOCUMENTS

| | | | |
|---|---|---|---|
| 4,394,642 A | | 7/1983 | Currie et al. |
| 4,901,319 A | | 2/1990 | Ross |
| 5,063,533 A | | 11/1991 | Erhart |
| 5,136,612 A | * | 8/1992 | Bi .................... 370/342 |
| 5,237,320 A | | 8/1993 | Toshifumi |
| 5,912,898 A | * | 6/1999 | Khoury ............... 714/701 |
| 5,930,230 A | | 7/1999 | Odenwalder et al. ....... 370/208 |
| 6,272,121 B1 | * | 8/2001 | Smith et al. ............ 370/342 |
| 6,272,652 B1 | | 8/2001 | Starr |
| 6,356,528 B1 | * | 3/2002 | Lundby et al. ........... 370/209 |
| 6,452,977 B1 | * | 9/2002 | Goldston et al. ......... 375/260 |
| 6,603,746 B1 | * | 8/2003 | Larijani et al. .......... 370/318 |
| 6,747,962 B2 | * | 6/2004 | Lintulampi et al. ...... 370/329 |
| 6,907,093 B2 | * | 6/2005 | Blount et al. ........... 375/346 |
| 6,917,614 B1 | * | 7/2005 | Laubach et al. ........ 370/392 |

FOREIGN PATENT DOCUMENTS

| | | |
|---|---|---|
| EP | 0551973 A2 | 7/1993 |
| EP | 0794631 A | 9/1997 |
| EP | 1059787 A | 12/2000 |
| WO | 9637050 A | 11/1996 |
| WO | 0078081 A | 12/2000 |
| WO | 0141313 A | 6/2001 |

* cited by examiner

*Primary Examiner*—Albert Decady
*Assistant Examiner*—Fritz Alphonse
(74) *Attorney, Agent, or Firm*—Steven A. Shaw; W. James Brady; Frederick J. Telecky, Jr.

(57) ABSTRACT

A multi-carrier communications system with a programmable interleaver and de-interleaver that can change the interleaving rate for data transmitted and received in the communications system is presented. The programmable interleaver and de-interleaver permits a level of flexibility in determining the immunity of the communications system to errors and sources of interference. The multi-carrier communications system is able to vary the interleaving rate based on input from a user or from data that it maintains from actual network performance. The multi-carrier communications system can change the interleaving rate during the initial installation of the multi-carrier communications system or whenever the system is reset or restarted or on any individual transmission unit.

33 Claims, 5 Drawing Sheets

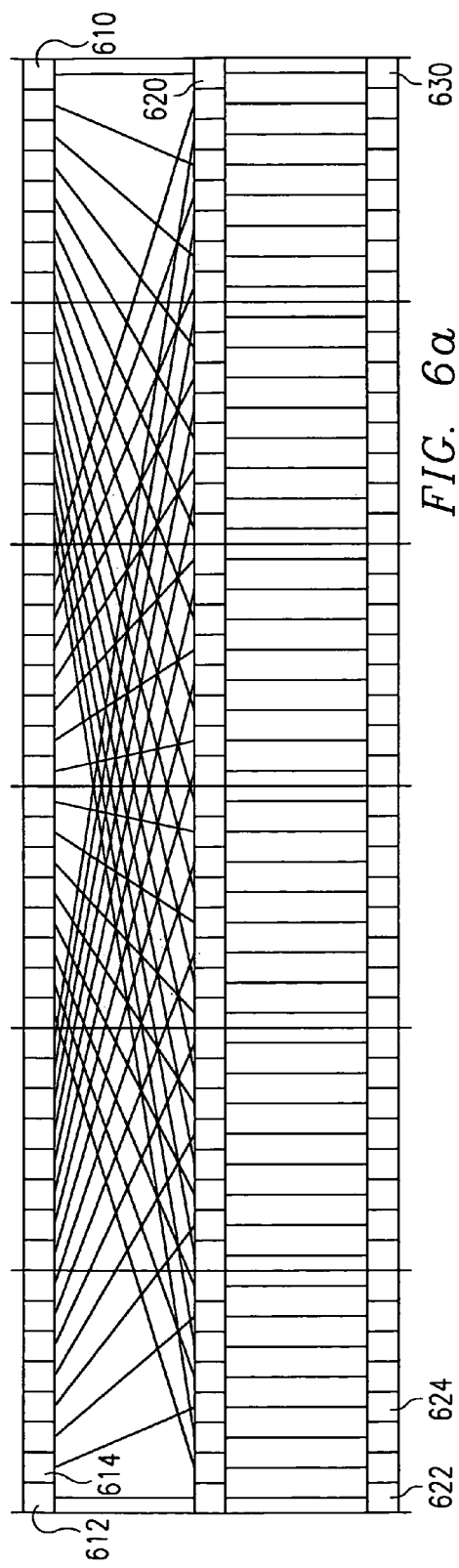
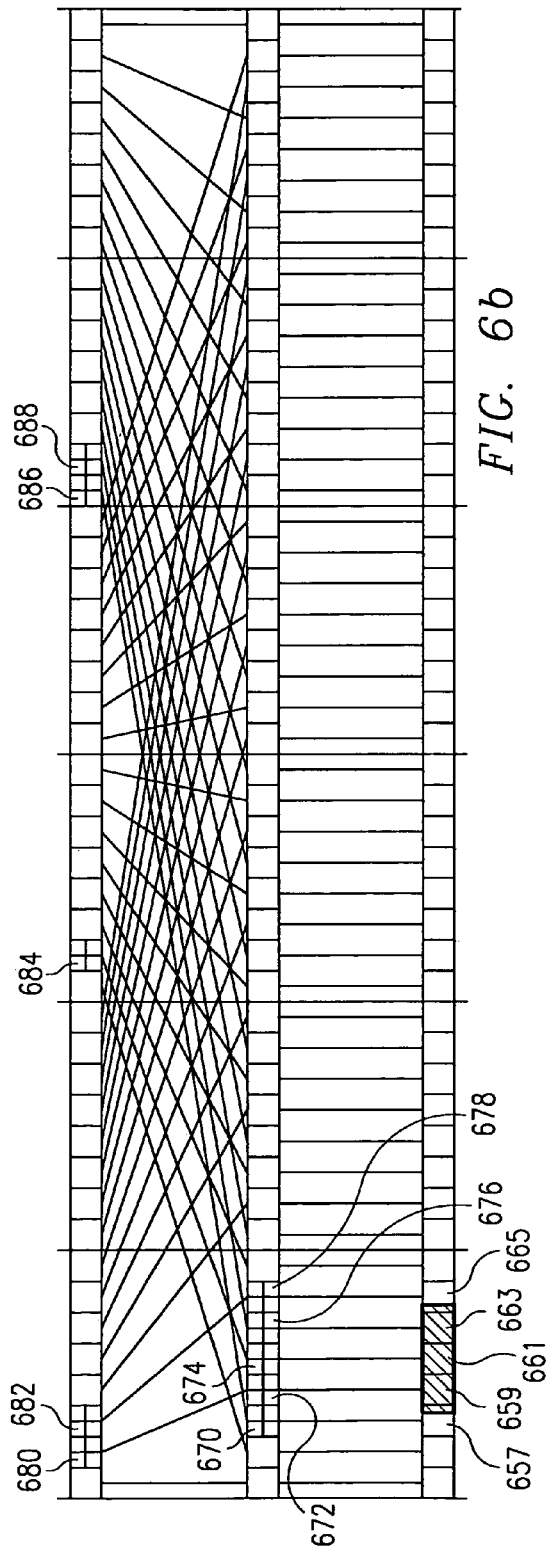
FIG. 6a
FIG. 6b

INTERLEAVING TO AVOID WIDEBAND INTERFERENCE IN A MULTI-CARRIER COMMUNICATIONS SYSTEM

FIELD OF THE INVENTION

This invention relates generally to digital communications systems, and particularly to methods for increasing the immunity of digital communications systems to sources of errors and interference.

BACKGROUND OF THE INVENTION

Interleaving is a technique used in modern communications systems to help increase immunity to errors and interference during transmission. Interleaving involves dispersing contiguous bits of data in a data stream across a transmission unit so that the data bits that are adjacent in the data stream are no longer adjacent in the transmission unit. As a result of dispersing the data bits, a randomly occurring error or some other source of interference that may be several bits wide that destroys several bits in a transmission unit will only destroy several bits of data from various positions throughout a data stream and not several contiguous data bits.

In communications systems, it is common to use an error correcting code that is designed to correct random errors. Such an error correcting code is not well suited to correct for the loss of several contiguous bits of data, resulting in an error that is not recoverable and requiring that the transmission unit be retransmitted. However, if the several destroyed bits of data were spread throughout the data stream, it is possible for such error correcting codes to correct the resulting randomized data bit errors. Additionally, as data coding schemes become more complex (required to transmit greater data rates) correcting multiple-bit errors becomes more difficult. As error correcting codes are required to correct more multiple-bit errors, they become more expensive in terms of reduced data-rates because of the redundancy required by the error correcting codes themselves becomes a larger percentage of the transmitted data stream.

Typically, the amount of interleaving is specified during the design stage of a communications system. The specification of the amount of the interleaving is crucial to the proper operation of the communications system. If devices in a communications system do not use a consistent amount of interleaving, then the devices would not be able to communicate with each other. Therefore, in most communications systems, the interleaving rate is specified (and is fixed) and is the same for all devices in the system.

However, communications system designers cannot foresee the future and it is impossible for them to anticipate all future sources of errors and interference. For example, according to the IEEE 802.11a technical standard, which is a multi-carrier communications system, adjacent data bits are separated by three subcarriers after they are interleaved. With each subcarrier being 312.5 KHz wide, errors and other sources of interference with bandwidths up to 600 MHz (approximately) can be tolerated without losing adjacent data bits using the specified interleaving rate.

The advantages of the IEEE 802.11a technical standard have become well known and the application of similar modulation techniques (known as multi-carrier modulation techniques) are under consideration for use in new standards. The IEEE 802.11a technical standard uses Orthogonal Frequency Division Multiplexing (OFDM) while another technical standard with application for high-speed digital data transfer using twisted-pair telephone lines uses Discreet Multitone (DMT). Both OFDM and DMT are multi-carrier modulation techniques. While the multi-carrier modulation techniques used in different standard may have differences with one another, the basic idea of using multiple subcarriers to transmit data is a basic foundation of all multi-carrier modulation techniques.

Since the adoption of the IEEE 802.11a technical standard in 1999, a new wireless network standard referred to as the Bluetooth standard has come into widespread use. According to the Bluetooth technical standard, information is transmitted in approximately one-MHz wide frames. Should a one-MHz wide Bluetooth frame collide with a multi-carrier data symbol, such as an IEEE 802.11a data symbol using the interleaving rate specified in the IEEE 802.11a technical standard, multiple adjacent data bits can be destroyed. When such a collision takes place and multiple adjacent data bits are destroyed, often the only remedy is to retransmit the data symbol.

Therefore, a need has arisen for a method that will permit communications systems to adapt to new sources of errors and interference as they develop.

SUMMARY OF THE INVENTION

In one aspect, the present invention provides a method for improving the immunity of a wireless communications system to interference and errors comprising: determining sources of errors and interference, determining a required interleaving based on the sources of errors and interference identified, providing the required interleaving to network devices in the wireless communications system, and using the provided information to configure a programmable interleaver and de-interleaver in each network device.

In another aspect, the present invention provides a method for improving the immunity of communications systems to frequency domain interference and errors comprising: determining the sources of errors and interference, determining a maximum bandwidth of the sources of errors and interference, and adjusting the transmission based on the maximum bandwidth.

An advantage of a preferred embodiment of the present invention is that the interleaving rate can be adjusted in a communications system to change the immunity of the communications system to spurious errors and interference.

Another advantage of a preferred embodiment of the present invention is that the interleaving rate can be adjusted by specifying a few parameters and requires no complex adjustments to the hardware of the communications system.

Yet another advantage of a preferred embodiment of the present invention is that the adjustments to the interleaving rate can be performed during the installation and configuration of the communications system so that all devices in the communications are operating with a common interleaving rate.

BRIEF DESCRIPTION OF THE DRAWINGS

The above features of the present invention will be more clearly understood from consideration of the following descriptions in connection with accompanying drawings in which:

FIG. 6*a* displays a set of interleaver permutations performed on a portion of an IEEE 802.11a data stream, where the interleaver permutations are as specified by the IEEE 802.11a technical standards;

FIG. 6*b* displays the damaging effects of a Bluetooth transmission frame when it collides with an IEEE 802.11a transmission unit using the interleaver permutations as displayed in FIG. 6*a*;

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Networks adhering to the IEEE 802.11 technical standard are among the most widely available wireless networks today. The IEEE 802.11b wireless network operates in the 2.4 GHz Industrial, Scientific, and Medical (ISM) RF spectrum band and provides up to 11 Mbps of data transfer rate and a more advanced version, IEEE 802.11a, operating in the 5 GHz Unified National Information Infrastructure (U-NII) band provides up to 54 Mbps of data transfer rate. The 802.11 wireless network is specified in a technical standard document, "ANSI/IEEE Std 802.11, 1999 Edition; Information technology —Telecommunications and information exchange between systems—Local and metropolitan area networks—Specific requirements. Part 11: Wireless LAN Medium Access Control (MAC) and Physical Layer (PHY) Specifications" which is incorporated herein by reference. The IEEE 802.11a wireless network is specified in a supplement to the IEEE 802.11 technical standard, "IEEE Std 802.11a-1999, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band," is also incorporated herein by reference.

In the discussion below, reference will be made to IEEE 802.11a wireless networks and the particular multi-carrier modulation technique (OFDM) specified by the IEEE 802.11a technical standard. However, the applicability of the ideas presented in the present invention is not limited to IEEE 802.11a wireless networks and OFDM. Rather, the ideas presented in the present invention have application in any network (wired and wireless) using any multi-carrier modulation technique. Therefore, the present invention should not be construed as being so limited.

Figure 1:
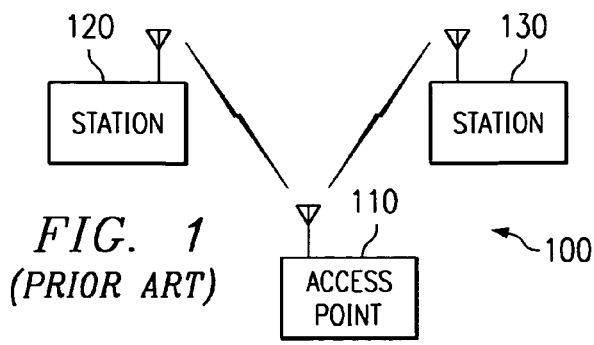
FIG. 1 illustrates an exemplary IEEE 802.11 wireless local area network.

Referring now to FIG. 1, a diagram (prior art) of a typical wireless network configuration according to the 802.11 technical standard is shown. Note that FIG. 1 displays one possible configuration of an 802.11 wireless network out of the many different configurations that are possible. FIG. 1 illustrates a wireless network 100 comprising an access point 110 that is wirelessly connected to a first wireless station 120 and a second wireless station 130.

In an 802.11 wireless network, there are two modes of communications, contention-free and contention communications. In contention-free communications, an access point controls all communications by transmitting poll frames to a wireless station, granting the wireless station the permission to transmit its own frames for a specified duration. In contention communications, each wireless station is able to contend for access to the shared communications medium. When a wireless station obtains access to the shared communications medium, it is free to transmit.

In a multi-carrier communications system, such as a system specified by the IEEE 802.11a technical standard, data bits are transmitted by placing each data bit into one of many different subcarrier frequencies. The encoding of the data bits into a transmittable data symbol is performed in the frequency domain, which is then converted into a time domain data symbol prior to transmission. The details of the encoding process are beyond the scope of the present discussion, but may be found in the IEEE 802.11a technical standard document.

According to the IEEE 802.11a technical standard, each subcarrier is approximately 312.5 KHz wide and 52 such subcarriers are used in a single transmission unit. The data bits in a transmission unit are evenly distributed across 48 subcarriers with the other 4 subcarriers being used for non-data carrying purposes. The distribution of data bits across the subcarriers is described in the IEEE 802.11a technical standard document.

Figure 2:
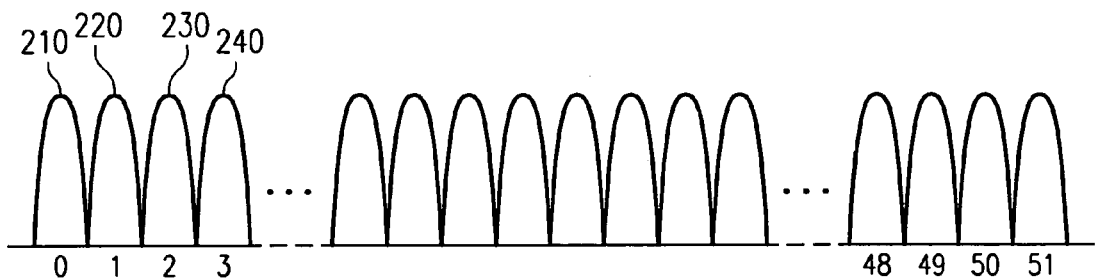
FIG. 2 illustrates an IEEE 802.11a subcarrier structure for a single data symbol.

Referring now to FIG. 2, a diagram (prior art) illustrates a subset of subcarrier frequencies used to carry data bits in a multi-carrier communications system such as an IEEE 802.11a wireless network. As discussed previously, the IEEE 802.11a wireless network uses 48 independent subcarriers to carry its data bits. Data bits are mapped onto the 48 subcarriers and each grouping is known as a data symbol. Depending upon the data rate, between one and six data bits are encoded into each subcarrier. FIG. 2 displays a subset of the 52 subcarriers. Each subcarrier is given a number. For example, a subcarrier 210 is also known as subcarrier zero, while subcarriers 220, 230, and 240 are subcarriers one, two, and three respectively. The $52^{nd}$ subcarrier is referred to as subcarrier 51.

After the data bits are mapped to the individual subcarriers, forming a data symbol, the data symbol is converted into a time domain representation, which is a stream of complex data values (data values with both real and imaginary components). The conversion is performed using an inverse Fourier Transform. Inverse Fourier Transforms are well known to persons of ordinary skill in the art of the present invention and need not be discussed. After converting the data symbol into its time domain representation, producing a stream of complex data values, the stream of complex data values are then filtered, amplified, and transmitted. A similar (but reversed) operation converts a received stream of complex data values back into a set of data bits.

Another wireless network standard is the Bluetooth (BT) special interest group (SIG) technical standard. Specified in the "Specification Volume 1: Specification of the Bluetooth System, Version 1.1, Feb. 22, 2001," which is incorporated herein by reference. Additionally, the IEEE has adopted Bluetooth as technical standard 802.15.1. BT wireless networks are intended as replacements for low data-rate wired connections, such as parallel and serial connections, and universal serial bus connections between digital devices. As such, BT wireless networks are typically small (or personal) area networks, implying low transmitted power levels.

Figure 3:
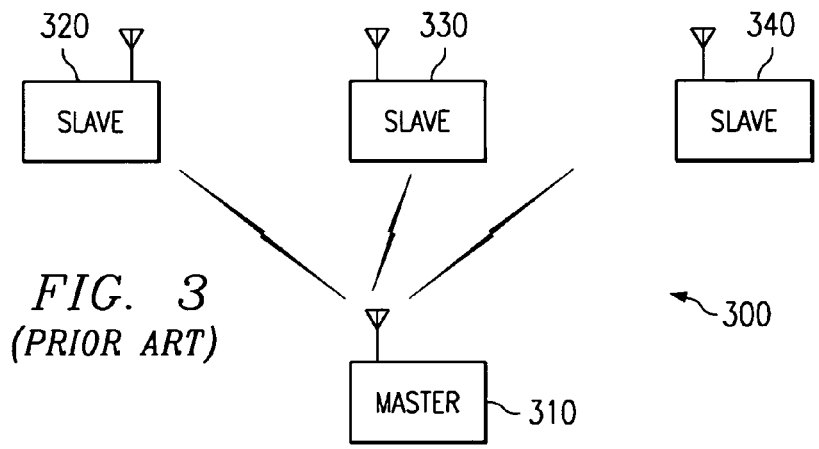
FIG. 3 illustrates an exemplary Bluetooth wireless network.

Referring now to FIG. 3, a diagram (prior art) of a typical wireless network configuration according to the BT SIG technical specifications. Note that FIG. 3 displays one possible configuration of a BT wireless network out of the many different configurations that are possible. FIG. 3 illustrates a BT wireless network 300 comprising a master unit 310 and three slave units 320, 330, and 340. The master unit 310 is wirelessly connected to the three slave units. According to the BT SIG specifications, a slave unit cannot communicate unless it is specifically addressed in a packet from the master unit.

A BT network operates in the 2.4 GHz ISM band, along with IEEE 802.11b wireless networks. It uses a frequency hopping, time-division duplex scheme with a time slot length of 625 micro-seconds. The transmission pattern is as follows: the master unit and the slave units are granted alternating time slots, with each slot being approximately one-MHz wide in bandwidth. After each time slot, the Bluetooth network changes transmission frequency. If a master unit is granted a time slot number 1, then the master unit can transmit during that time slot and all subsequent odd numbered time slots. Time slots dedicated to the master unit are referred to as master->slave (master-to-slave) time slots. The slave unit(s) are then assigned time slot number 2 and then all subsequent even numbered time slots. Time slots dedicated to the slave unit(s) are referred to as slave->master (slave-to-master) time slots. A unit, either master or slave(s), cannot transmit outside of its assigned time slots, without using special provisions provided for transmitting a packet of length greater than one time slot.

Figure 4:
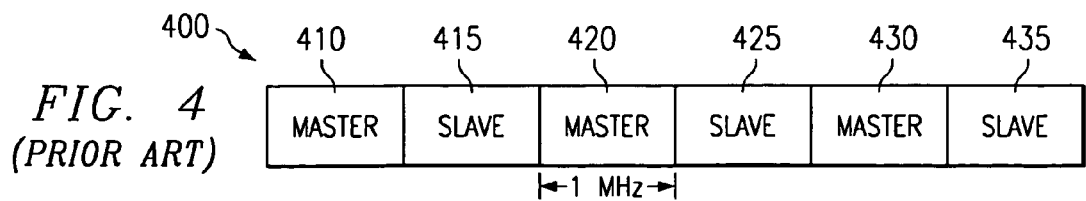
FIG. 4 illustrates a Bluetooth time slot transmission structure.

Referring now to FIG. 4, a diagram (prior art) illustrates the alternating master->slave and slave->master time slot structure of a Bluetooth wireless network. FIG. 4 displays an alternating sequence of Bluetooth master->slave and slave->master time slots (slots 410, 415, 420, 425, 430, and 435). A Bluetooth master unit may transmit to a single slave unit or multiple slave units in a single master->slave time slot. A Bluetooth slave unit may only transmit a response back to a Bluetooth master unit if it was specifically addressed in a master to slave transmission. Additionally, the Bluetooth slave unit must transmit in the slave->master time slot immediately following the master->slave unit that carried the master to slave transmission, unless the slave->master time slot has already been reserved.

With BT wireless networks operating in the 2.4 GHz ISM band and IEEE 802.11a wireless networks operating in the 5 GHz U-NII band, there is no conflict between the two types of networks. However, there is work underway to increase the data-rate of IEEE 802.11 wireless networks in the 2.4 GHz ISM band, and one proposed method to achieve greater data rates is to use the multi-carrier techniques of IEEE 802.11a in the 2.4 GHz ISM band. Unfortunately, by bringing the IEEE 802.11a multi-carrier technology into the 2.4 GHz ISM band, IEEE 802.11a based wireless networks will have to face Bluetooth wireless networks as a potential interference source.

Because the IEEE 802.11a data symbol is spread over a minimum of a 16.6 MHz wide frequency range (48 subcarriers at 312.5 KHz per subcarrier+4 additional subcarriers, also at 312.5 KHz each, used for non-data transmission purposes), and the 2.4 GHz ISM band is 83 MHz wide (from 2400 MHz to 2483 MHz), when an IEEE 802.11a based wireless network is transmitting, it is occupying at least 20 percent of the 2.4 GHz ISM band. This is means that when both IEEE 802.11a based wireless networks and Bluetooth wireless networks are operating, there is a significant chance of a collision each time both networks are transmitting.

Figure 5:
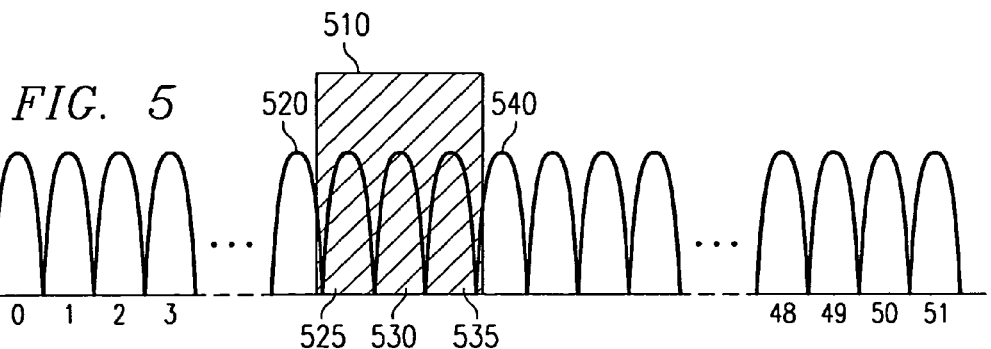
FIG. 5 illustrates the effects of a collision between an IEEE 802.11a data symbol and a Bluetooth transmission frame, represented in a frequency domain view.

Referring now to FIG. 5, a diagram displaying a collision between a Bluetooth transmission and an IEEE 802.11a data symbol. FIG. 5 displays a frequency domain view of the collision between the transmissions. A Bluetooth transmission, represented as a shaded block 510, is displayed as overlapping multiple IEEE 802.11a subcarriers (520, 525, 530, 535, and 540). Because a Bluetooth transmission 510 is approximately one-MHz wide while each of the IEEE 802.11a subcarriers are 312.5 KHz, the Bluetooth transmission 510 can completely obliterate three subcarriers (525, 530, and 535 in FIG. 5) and cause damage to two subcarriers 520 and 540. Any data contained in the three obliterated subcarriers (525, 530 and 535) is lost and data in the two damaged subcarriers (520 and 540) are at the very least, partially lost. The relative magnitudes (heights) of the Bluetooth transmission 510 and the IEEE 802.11a subcarriers are not intended to be an accurate representation of the actual transmitted signal powers of the two wireless networks and should not be construed as being such a representation.

Interleaving involves the dispersion of a contiguous group of data bits in order to reduce the probability of contiguous data bits being damaged. For example, let "A B C D E F G H I J" be a sequence of ten data bits, with each letter representing a single data bit. If interleaving is such that the data bits are separated by two, referred to as an interleaving rate of two, then the sequence would be represented as "A C E G I B D F H J" after interleaving. If interleaving is such that the data bits are separated by five, referred to as an interleaving rate of five, then the sequence would be represented as "A F B G C H D I E J" after interleaving. The purpose of interleaving is to reduce the probability of an error damaging adjacent bits in the original sequence. For example, an error spanning two bits will result in adjacent bits being damaged in the original sequence, while in either of the two interleaved sequences, such an error will not result in two adjacent bits (from the original sequence) being damaged.

The larger the interleaving rate, the larger the error can be before adjacent data bits in the original sequence are damaged. However, since the interleaving is done in a circular manner via modulo arithmetic, if the interleaving rate is increased to too large a value, the actual error immunity is reduced. In the example above, the sequence interleaved at a rate of two is actually immune to a larger error than the sequence interleaved at a rate of five. The sequence interleaved by two can tolerate an error damaging four data bits without resulting in adjacent data bits in the original sequence being damaged while the sequence interleaved by five can only tolerate an error damaging two data bits.

According to the IEEE 802.11a technical standard, the data bits in the data symbol are interleaved using a first expression:

$$i=(N_{CBPS}/16)(k \bmod 16)+\text{floor}(k/16); k=0, 1, \ldots, N_{CBPS}-1$$

where k is the index of the data bits of the data symbol, i is index after the first permutation, $N_{CBPS}$ is the number of bits per data symbol, mod is modulo arithmetic, and floor(n) is a function returning the largest integer not exceeding n. The numerical value, 16, is referred to here as a space value and plays a vital role in dispersing the data bits across the subcarriers. The results of the first permutation is then permuted using a second expression:

$$j=s*\text{floor}(i/s)+(i+N_{CBPS}-\text{floor}(16*i/N_{CBPS})) \bmod s;\\ i=0, 1, \ldots, N_{CBPS}-1$$

where j is the index after the second permutation, s is calculated using the expression:

$$s=\max(N_{BPSC}/2, 1);$$

where $N_{BPSC}$ is the number of bits per subcarrier. The purpose of the second expression is to add an additional factor of randomness into the permutation. This randomness is confined to the allocation of bits within a subcarrier and does not affect the dispersion of bits across subcarriers. Application of the expressions for i and j, result in adjacent data bits in the data symbol being spread three subcarriers apart after interleaving.

Referring now to FIG. 6a, a diagram illustrates the effects of the interleaving permutations as specified by the IEEE 802.11a technical standard on an exemplary set of values. For the diagram displayed in FIG. 6a, $N_{CBPS}$ is 48 and $N_{BPSC}$ is one. As discussed previously, the IEEE 802.11a technical standard permits up to six data bits per subcarrier, if this were the case, then $N_{CBPS}$ would be 288 and $N_{BPSC}$ would be six. FIG. 6a displays a first horizontal row of boxes 610 that represents the data bits in a data stream, a second horizontal row of boxes 620 that represents the data bits after the first permutation, and a third horizontal row of boxes 630 that represents the data bits after the second permutation. Each box in the three rows of boxes represents a single data bit in a subcarrier or bin. Had the $N_{BPSC}$ been greater than one, where each subcarrier would hold more than one data bit, then the figure would necessarily be different to represent the individual mapping of each data bit into different boxes.

In between the first horizontal row of boxes 610 and the second horizontal row of boxes 620 is a series of lines connecting pairs of boxes. Each line represents a mapping between the pair of boxes as specified by the first permutation. A similar set of lines between the second horizontal row of boxes 620 and the third horizontal row of boxes 630 represents a mapping between pairs of boxes as specified by the second permutation. For example, the lines between box 612 and box 622 signify that the data bit in box 622 is mapped to box 622 by the permutations. The data bit in box 614 is mapped to box 624. Notice that adjacent boxes 612 and 614 (from the first horizontal row of boxes 610) are mapped to boxes 622 and 624 (in the third horizontal row of boxes 630) that are three apart.

Referring now to FIG. 6b, a diagram illustrating the effect of an exemplary one-MHz interferer on the IEEE 802.11a data symbol as displayed in FIG. 6a. FIG. 6b displays a frequency domain view of the collision. A one-MHz interferer 655, possibly from a Bluetooth wireless network, collides with an IEEE 802.11 data symbol in its transmitted form. As a result of the collision with the one-MHz interferer 655, five subcarriers (657, 659, 661, 663, and 665) have been damaged. The five damaged subcarriers are mapped to five other subcarriers (670, 672, 674, 676, and 678) in a second row of subcarriers. The second row of subcarriers represents the data symbol after the first interleaving permutation. The five damaged subcarriers in the second row of subcarriers are mapped into five other subcarriers (680, 682, 684, 686, and 688) in a third row of subcarriers. The third row of subcarriers represents the original data stream prior to any interleaving.

It is important to notice that some of the damaged subcarriers (680 and 682, and 686 and 688) are adjacent to each other. This signifies that adjacent data bits in the data stream have been damaged by the one-MHz interferer. When adjacent data bits are damaged, it is much more difficult to correct using an error correcting code than when single data bits are damaged.

Changing the interleaving rate can increase (or decrease) a communications system's ability to tolerate errors and interference. Increasing the interleaving rate can result in adjacent data bits in an original sequence being mapped further apart in a final transmitted sequence, therefore, increasing the communications system ability to withstand larger (wider bandwidth) errors and interferers.

According to a preferred embodiment of the present invention, the data bits in an IEEE 802.11a data symbol are interleaved using a first expression:

$$i=(N_{CBPS}/8)(k \bmod 8)+\text{floor}(k/8); k=0, 1, \ldots, N_{CBPS}-1$$

where k is the index of the data bits of the data symbol, i is index after the first permutation, $N_{CBPS}$ is the number of bits per data symbol, mod is modulo arithmetic, and floor(n) is a function returning the largest integer not exceeding n. The results of the first permutation is then permuted using a second expression:

$$j=s*\text{floor}(i/s)+(i+N_{CBPS}-\text{floor}(8*i/N_{CBPS})) \bmod s; i=0, 1, \ldots, N_{CBPS}-1$$

where j is the index after the second permutation, s is calculated using the expression:

$$s=\max(N_{BPSC}/2, 1);$$

where $N_{BPSC}$ is the number of bits per subcarrier. Application of the expressions for i and j, result in adjacent data bits in the data symbol being spread six subcarriers apart after interleaving.

Figure 7A:
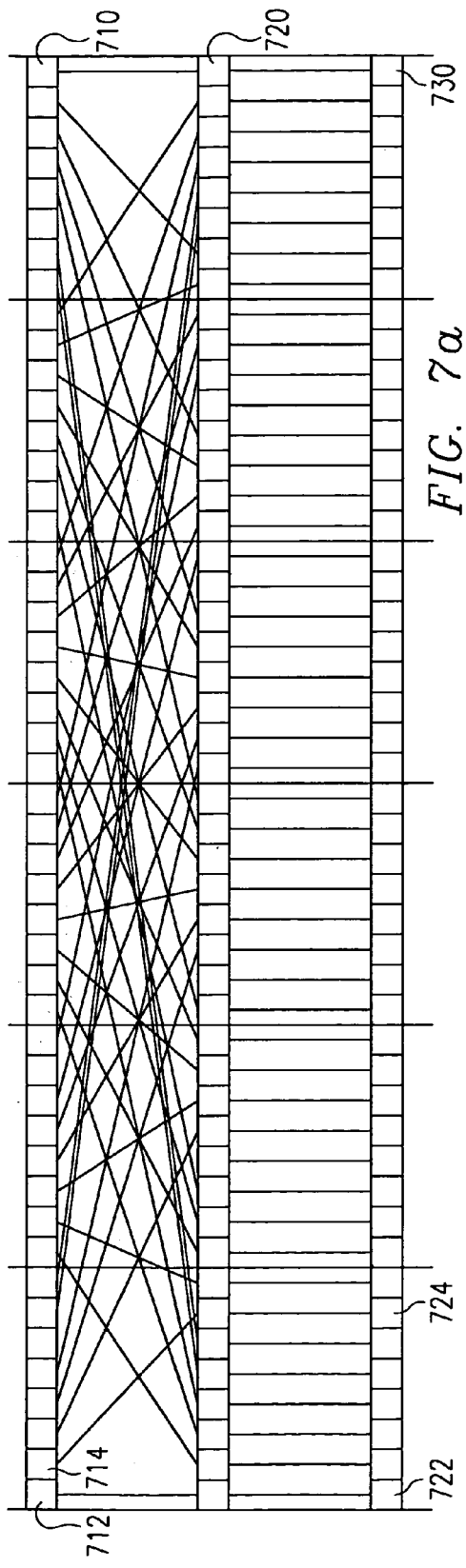
FIG. 7*a* displays a set of interleaver permutations performed on a portion of an IEEE 802.11a data stream, where the interleaver permutations are in accordance with a preferred embodiment of the present invention.

Referring now to FIG. 7a, a diagram illustrates the effects of the interleaving permutations according to a preferred embodiment of the present invention on an exemplary set of values. For the diagram displayed in FIG. 7a, $N_{CBPS}$ is 48 and $N_{BPSC}$ is one. FIG. 7a displays a first horizontal row of boxes 710 that represents the data bits in a data stream, a second horizontal row of boxes 720 that represents the data bits after the first permutation, and a third horizontal row of boxes 730 that represents the data bits after the second permutation. Each box in the three rows of boxes represents a single data bit in a subcarrier or bin.

In between the first horizontal row of boxes 710 and the second horizontal row of boxes 720 is a series of lines connecting pairs of boxes. Each line represents a mapping between the pair of boxes as specified by the first permutation. A similar set of lines between the second horizontal row of boxes 720 and the third horizontal row of boxes 730 represents a mapping between pairs of boxes as specified by the second permutation. For example, the lines between box 712 and box 722 signify that the data bit in box 722 is mapped to box 722 by the permutations. The data bit in box 714 is mapped to box 724. Notice that adjacent boxes 712 and 714 are mapped to boxes 722 and 724 that are six boxes apart.

Figure 7B:
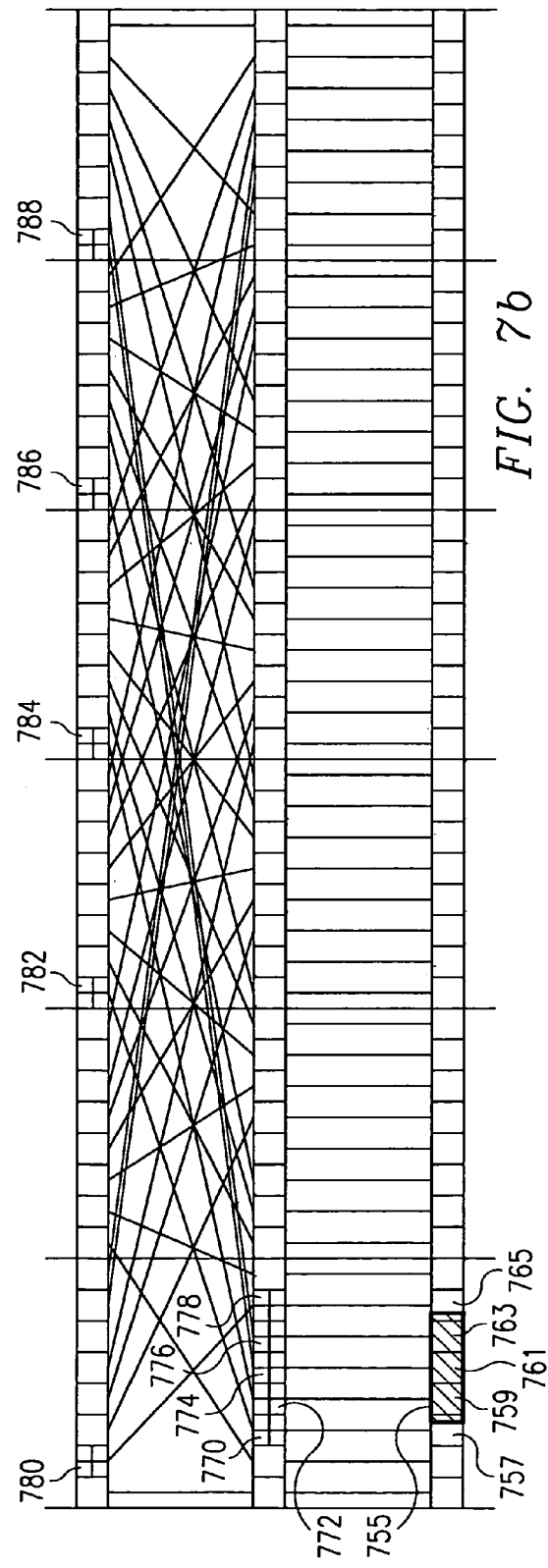
FIG. 7*b* displays the damaging effects of a Bluetooth transmission frame when it collides with an IEEE 802.11a transmission unit using the interleaver permutations as displayed in FIG. 7*a*.

Referring now to FIG. 7b, a diagram illustrating the effect of an exemplary one-MHz interferer on the IEEE 802.11a data symbol as displayed in FIG. 7a. FIG. 7b presents a frequency domain view of the collision. A one-MHz interferer 755, possibly from a Bluetooth wireless network, collides with an IEEE 802.11 data symbol in its transmitted form (post interleaving). As a result of the collision with the one-MHz interferer 755, five subcarriers (757, 759, 761, 763, and 765) have been damaged. The five damaged subcarriers are mapped to five other subcarriers (770, 772, 774, 776, and 778) in a second row of subcarriers. The second row of subcarriers represents the data symbol after the first interleaving permutation. The five damaged subcarriers in the second row of subcarriers are mapped into five other subcarriers (780, 782, 784, 786, and 788) in a third row of subcarriers. The third row of subcarriers represents the original data stream prior to any interleaving.

It is important to notice that none of the damaged data bits are adjacent to each other in the original data symbol. By increasing the interleaving rate from three subcarriers to six subcarriers, the wireless network is now able to tolerate a one-MHz interferer without any adjacent data bits being damaged.

A wireless network with a fixed interleaving rate cannot adapt itself as the need arises in the future. An interleaving rate that appears to be adequate today, may, in the future, be incapable of accepting interference from sources of interference that were not available at the time of the design of the wireless network. According to a preferred embodiment of the present invention, a solution to the problem would be building wireless network devices with programmable interleavers and de-interleavers that are programmable.

Figure 8:
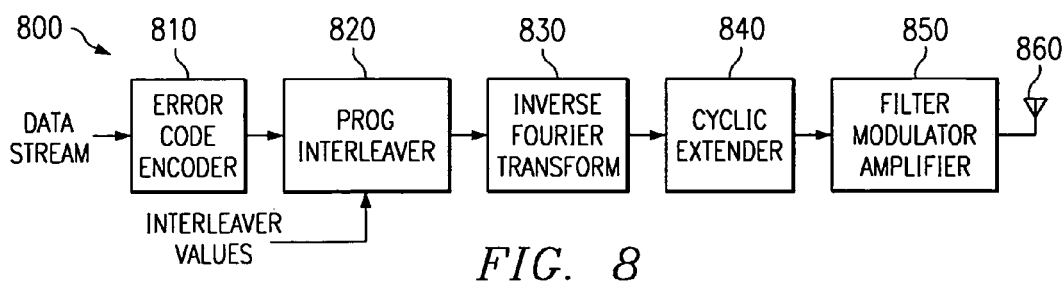
FIG. 8 illustrates a transmission path for a wireless network device according to a preferred embodiment of the present invention.

Referring now to FIG. 8, a diagram illustrates a transmit path 800 of a wireless network device according to a preferred embodiment of the present invention. The transmit path 800 is a fairly typical transmit path, comprising an error code encoder 810, a programmable interleaver 820, an inverse Fourier Transform unit 830, a cyclic extender unit 840, a filter-modulator-amplifier unit 850, and an antenna 860. The error code encoder 810 encodes a data stream provided to it via a processor (not shown) that is connected to the error code encoder 810 or a digital device (not shown) that is coupled to the wireless network device. It is the error code encoder 810 that provides the data stream with an error correcting (or error detecting) code that helps to increase the communications system's immunity to noise and errors.

The encoded data stream is then interleaved by the programmable interleaver 820. In a typical wireless network, the programmable interleaver 820 would be replaced with an interleaver, which would have a fixed method for interleaving the encoded data stream. However, according to a preferred embodiment of the present invention, the programmable interleaver 820 has an additional input that provides the programmable interleaver 820 with interleaver values that are used to change the function of the interleaver. According to a preferred embodiment of the present invention, the interleaver values are the actual index values used to map the encoded data stream into the interleaved data stream.

According to another preferred embodiment of the present invention, the interleaver values are values such as $N_{CBPS}$, $N_{BPSC}$, the modulo factor, the space value, etc. that are used to specify the expressions describing the interleaving functions. Examples of how these values are used to generate the index values were discussed previously (discussions of FIGS. 6a and 7a). Alternatively, the actual expressions for the interleaving can be provided to the programmable interleaver 820. In the last two embodiments, the programmable interleaver 820 would require a processing unit to calculate the index values from the expressions or interleaver values.

After interleaving, the interleaved data stream is mapped to frequency domain constellations which are fed to the inverse Fourier Transform unit 830 that converts the interleaved data stream into its time domain representation. The time domain data stream is then cyclically extended in the cyclic extension unit 840. The cyclic extension provides a guard band for the time domain data stream, to help reduce the effects of intersymbol interference. Finally, the extended time domain data stream enters the filter-modulator-amplifier unit 850 where it is filtered (to ensure that only the desired signals are transmitted), modulated (to some carrier frequency), and amplified (to the proper signal levels for transmission). The filtered, modulated, and amplified extended time domain data stream is transmitted via the antenna 860.

Figure 9:
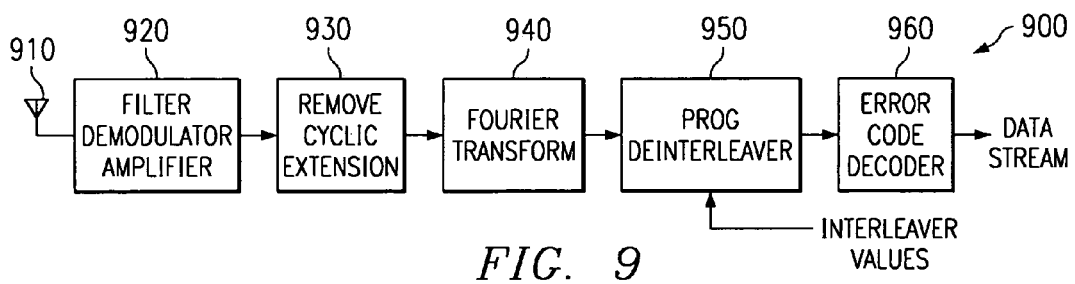
FIG. 9 illustrates a receive path for a wireless network device according to a preferred embodiment of the present invention.

Referring now to FIG. 9, a diagram illustrates a receive path 900 of a wireless network device according to a preferred embodiment of the present invention. The receive path 900 is essentially the reverse of the transmit path 800 displayed in FIG. 8. An antenna 910 (may be the same as the antenna 860 from FIG. 8) receives the transmitted signals and a filter-demodulator-amplifier unit 920 transforms the received signals back to an internal frequency signal that is suitable for processing by the remainder of the receive path 900. A remove cyclic extension unit 930 removes the guard band that was inserted by the cyclic extension unit 840 while a Fourier Transform unit 940 converts the time domain signal back into its frequency domain representation.

A programmable de-interleaver 950 performs a de-interleaving operation to return the interleaved signal stream to its normal, un-interleaved form. According to a preferred embodiment of the present invention, the programmable de-interleaver 950 is provided with the de-interleaver index values needed to reverse the mapping operation performed by the programmable interleaver 820. According to other preferred embodiments of the present invention, the programmable de-interleaver 950 can be provided with de-interleaver expression values such as $N_{CBPS}$, $N_{BPSC}$, the modulo factor, etc. or the programmable de-interleaver 950 may be provided with the actual de-interleaver expressions themselves.

After de-interleaving, the data stream is sent to the error code decoder unit 960, where the error code decoder unit 960 uses the error correcting (or error detecting) code to correct any correctable errors (or detect any errors) present in the data stream. The output of the error code decoder unit 960 is then presented to a processor (not shown) connected to the receive path or a digital device (not shown) coupled to the wireless network device.

The programmable interleaver (and de-interleaver) can be configured with the proper interleaving rate during the installation of the wireless network or by an information transfer during a training period. For example, during the installation process, a software program may ask the installer information about what other wireless networks are installed in the local vicinity. Based on a stored database, the wireless network can be configured with a proper interleaving rate.

Additionally, data about network performance can be maintained during normal network operations. The data can then be used to configure the programmable interleaver during the next time that the wireless network is reset or re-initialized or for subsequent transmissions. Examples of data that may be maintained during normal network operations that may be used to help determine sources of interference and errors include, but are not limited to, recording and examining error patterns (certain types of interference, such as microwave ovens, have distinct patterns), duration of an extended burst of errors, noise spectral density, frequency of error correcting code usage to correct faulty data bits, bit error rate, frame error rate, etc.

A programmable interleaver may be implemented in either software or hardware. If it is implemented in software, the software programmable interleaver has an advantage of flexibility and ease of implementation. If it is implemented in hardware, the hardware programmable interleaver has an advantage of speed of operation. A programmable de-interleaver is an analogue to the programmable interleaver and can be implemented in either software or hardware, using essentially the same design as the programmable interleaver.

Figure 10:
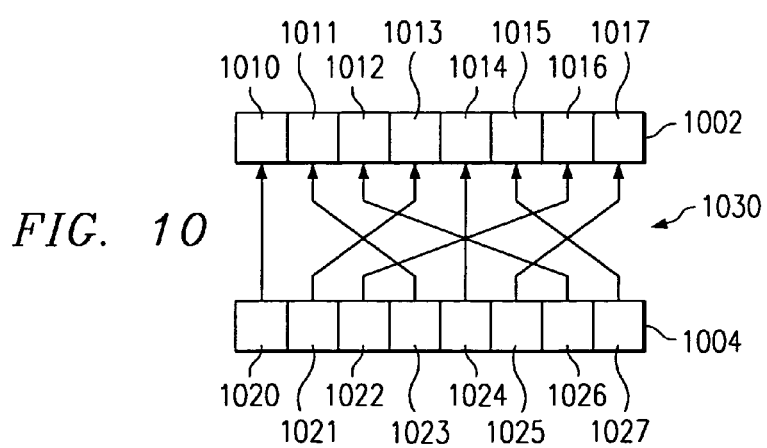
FIG. 10 illustrates a software programmable interleaver according to a preferred embodiment of the present invention.

Referring now to FIG. 10, a diagram illustrates a software programmable interleaver according to a preferred embodiment of the present invention. A software implementation of a programmable interleaver is based upon two blocks of memory, a first block of memory 1002 is used to store the data bits of the data stream and a second block of memory 1004 is used to store a set of pointers. A pointer is a software entity that contains an address of a memory location. Pointers are used for indexing into memory arrays, creating lists of various items, etc. For example, if a pointer contains a value of 10, then when a program uses that particular pointer, then it is in actuality, accessing the contents of memory location 10.

According to a preferred embodiment of the present invention, the second memory block 1004 contains an array of pointers. The array of pointers contains a number of pointers that is equal to the number of data bits stored in the first block of memory 1002. After the software programmable interleaver is provided with the index values, the software programmable interleaver loads the index values into the second block of memory. As an example, a pointer stored in a memory location 1020 contains an address of a memory location 1010. In this particular example, a first bit of the interleaved data stream contains the first bit of the un-interleaved data stream.

According to another preferred embodiment of the present invention, the software programmable interleaver is provided with a set of interleaver expression values or with the actual interleaver expressions themselves. The software programmable interleaver then calculates the index values from the expression values or the expressions and then configures the array of pointers based on the calculated values.

With the array of pointers properly configured, when the software programmable interleaver wishes to output an interleaved data stream, it simply outputs the contents of the memory locations pointed to by each of the pointers. For example, the software programmable interleaver would output the contents of the memory location pointed to by pointer 1020, then pointer 1021, then pointer 1022, and so on.

Figure 11A:
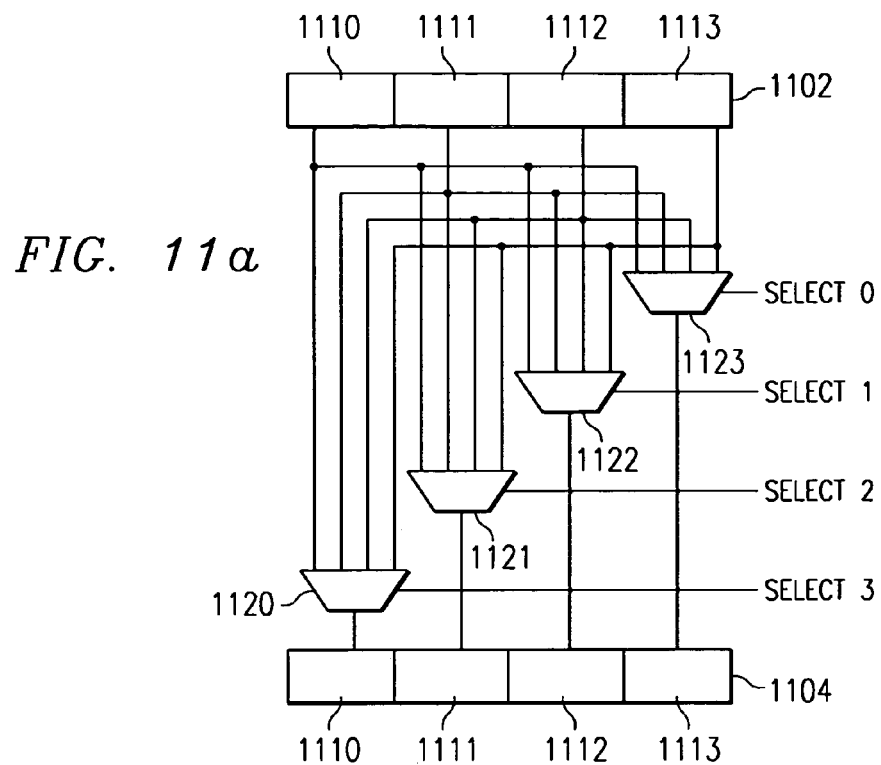
FIGS. 11*a–b* illustrate embodiments of a hardware programmable interleaver according to preferred embodiments of the present invention.

Referring now to FIG. 11a, a diagram illustrates a hardware programmable interleaver according to a preferred embodiment of the present invention. This particular implementation of a hardware programmable interleaver also uses two memory banks, a first memory bank 1102 contains the data bits of the data stream and a second memory bank 1104 contains the interleaved data bits of the data stream. The actual interleaving is performed by a series of multiplexors (1120, 1121, 1122, and 1123). In the particular example shown in FIG. 11a, the multiplexors are 4-to-1 multiplexors, with four inputs and one output. Each multiplexor is controlled via a select line (selects 0–3). Any of the four inputs can be selected and be connected to the output via a select line.

The FIG. 11a displays a hardware programmable interleaver that is fully programmable, meaning that any of the data bits in the first memory bank 1102 can be output to any of the memory locations in the second memory bank 1104. While this particular configuration allows for maximum programmability, it also uses the largest and most complex multiplexors. A less flexible implementation could use smaller multiplexors at a cost of less flexibility in the different interleaving rates supported.

Once the various multiplexors are configured by use of select lines based on index values provided externally, the data bits of the data stream from the first memory bank 1102 are then available in the second memory bank 1104. The hardware programmable interleaver can then produce the interleaved output whenever it is called to do so. According to another preferred embodiment of the present invention, the programmable interleaver is configured using interleaver expression values or interleaver expressions that are provided externally and used to calculate the index values for configuring the various multiplexors.

Figure 11B:
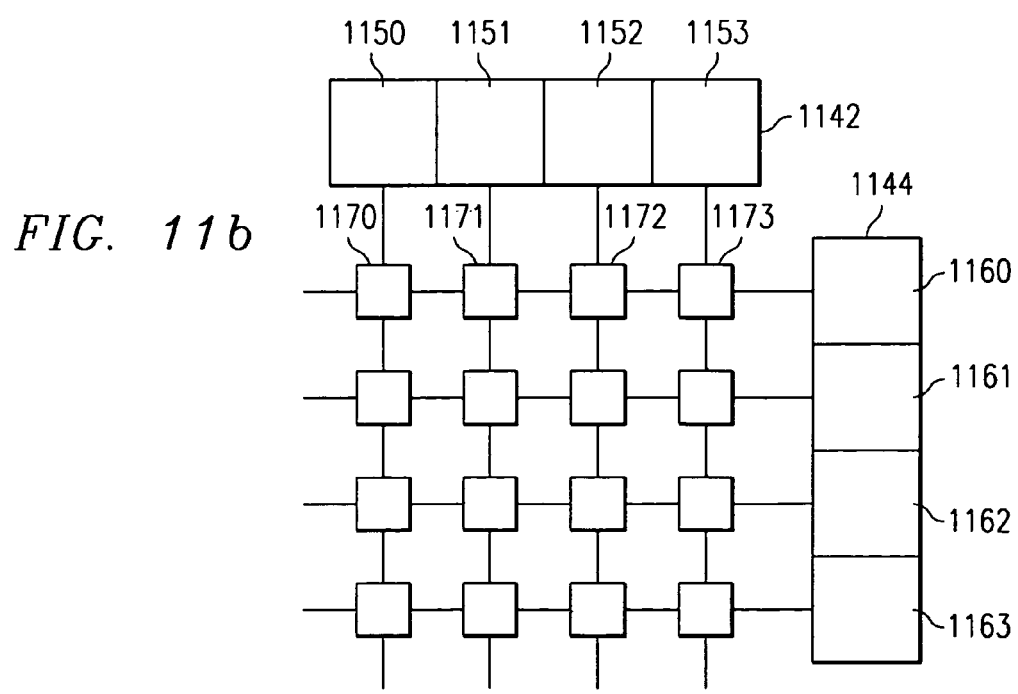

Referring now to FIG. 11b, a diagram illustrates a hardware programmable interleaver according to another preferred embodiment of the present invention. While the hardware programmable interleaver shown in FIG. 11a used a series of multiplexors, the hardware programmable interleaver shown in FIG. 11b uses a crossbar switch. According to a preferred embodiment of the present invention, the crossbar switch is implemented via a series of programmable switches (1170, 1171, 1172, and 1173 are examples of the programmable switches). The actual implementation of a crossbar switch is not important to the proper function of the hardware programmable interleaver. Any implementation of a properly functioning crossbar switch is as equally functional as any other properly functioning crossbar switch.

Once again, the programmable switches are programmed via select lines based on information provided to the hardware programmable interleaver from external sources. The select lines can be thought of as performing a mapping between the plurality of inputs to the plurality of outputs, with one input being connected to one output. When the crossbar switch is programmed, the data bits of the data stream (stored in a first memory bank 1142) are present in a second memory bank 1144, where they can be outputted by the hardware programmable interleaver when it is called on to do so. According to a preferred embodiment of the present invention, this mapping operation is known as a one-to-one mapping. In a one-to-one mapping, one input is connected to one output, with no two inputs going to the same output and no two outputs carrying the information provided by a single input.

According to another preferred embodiment of the present invention, the interleaving is not dependent solely upon errors and sources of interference. The dispersion of the data bits is also dependent upon network operating conditions. An example of network operating conditions can be as simple as the availability of subcarriers or differences in subcarrier frequencies. If a subcarrier cannot carry its full complement of data bits, the dispersion of the data bits must be modified to accommodate that subcarrier. Alternatively, the dispersion of the data bits is also dependent upon the operating frequency of the wireless network. For example, in an IEEE 802.11a wireless network that is operating in the 5 GHz U-NII band, there are currently few identified sources of interference. Therefore, such a network may operate using the specified transmission parameters. However, should the same network be operating in busier band, such as the 2.4 GHz ISM band, where there are many identified sources of interference, the network could adjust its transmissions accordingly to increase its immunity to interference and errors.

According to yet another preferred embodiment of the present invention, the communications network is a wireline peer-to-peer communications network, where individual network devices are connected to one another via some wired transmission line. After determining sources of interference and errors, the various network devices can adjust the way in which they transmit data to increase the network's immunity to the sources of interference and errors. For example, the network devices may choose to not place any data bits in subcarriers that are affected by the sources of interference and errors. Alternatively, the network devices may choose to transmit the data bits interleaved in a different fashion.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for improving immunity to interference and errors in a wireless communications network using multicarrier modulation with a plurality of network devices, the method comprising:
   determining interleaving values based on interference and errors;
   providing the interleaving values to each network device; and
   configuring a programmable interleaver and de-interleaver in each network device based on the interleaving values, the interleaving values being used to change a function of the programmable interleaver and de-interleaver.

2. The method of claim 1, further comprising determining sources of the interference and errors, wherein the determining sources step comprises use of information regarding network operating conditions.

3. The method of claim 2, wherein the information are selected from the group consisting of: other wireless networks, sources of noise, sources of interference, operating frequency of the wireless communications network, and combinations thereof.

4. The method of claim 2, wherein determining interleaving values further comprises:
   searching a data table for spectral information based on the information; and
   retrieving the interleaving values from the data table.

5. The method of claim 1, wherein the wireless communications network is controlled by a network controller, wherein the controller maintains measurements of a network performance, and wherein the interference and errors are determined by the controller parsing the measurements of network performance, searching for interference and errors.

6. The method of claim 5, wherein determining interleaving values further comprises:
   determining from the measurements of network performance a largest interferer and error source; and
   calculating the interleaving values so that the wireless communications network is substantially immune to the largest interferer and error source.

7. The method of claim 1, wherein providing the interleaving values to each network device comprises transmitting the calculated interleaving values to each network device during a training sequence.

8. The method of claim 1, wherein providing the interleaving values to each network device comprises transmitting the calculated interleaving values to each network device after a reset of the wireless communications network.

9. The method of claim 1, wherein providing interleaving values to each network device comprises transmitting the calculated interleaving values to each network device after an initial installation of the wireless communications network.

10. The method of claim 1, wherein configuring comprises providing a set of index values to the programmable interleaver and de-interleaver.

11. The method of claim 1 wherein the interleaving values are specified by a set of permutation expressions, and wherein configuring further comprises:
   providing the set of permutation expressions to each network device;
   calculating a set of index values from the set of permutation expressions provided to each network device; and
   providing the set of index values to the programmable interleaver and de-interleaver of each network device.

12. The method of claim 11, wherein the set of permutation expressions comprise:

$$i=(+N_{CBPS}/8)(k \bmod 8)+\mathrm{flooR}(K/8); k=0, 1, \ldots : N_{CBPS}-1$$

$$j=s*\mathrm{floor}(i/s)+(i+N_{CBPS}-\mathrm{FLOOR}(8*l/N_{CBPS})) \bmod s; i=0, 1, \ldots N_{CBPS}-1$$

where k is the index of the data bits of the data symbol, i is index after the first permutation, $N_{CBPS}$ is the number of bits per data symbol, mod is modulo arithmetic, and floor( ) is a function returning the largest integer not exceeding the expression in the parenthesis, j is the index after the second permutation, and s is calculated using the expression $$s=\max(N_{CBPS}/2, 1)$$

where $N_{CBPS}$ is the number of bits per subcarrier.

13. The method of claim 1, wherein the interleaving values are specified by a set of permutation expression values, and wherein configuring further comprises:
   providing the set of permutation expression values to each network device;
   calculating a set of index values from the set of permutation expression values provided to each network device; and
   providing the set of index values to the programmable interleaver and deinterleaver of each network device.

14. The method of claim 13, wherein the set of permutation expression values are selected from the group consisting of a number of bits per data symbol, a number of bits per subcarrier, a space value, and combinations thereof.

15. The method of claim 1, wherein the interference and errors are determined by an operating frequency of the wireless network.

16. The method of claim 1, wherein determining interleaving values further comprises:
searching a data table for spectral information based on an operating frequency of the wireless network; and
determining the interleaving values based on the spectral information.

17. A method for improving immunity to sources of interference and errors in a communications network using multi-carrier modulation with a plurality of network devices, the method comprising:
determining an interleaving value based on the sources of interference and errors; and
modifying a transmission to increase immunity to the sources of interference and errors
basal on the determined interleaving value.

18. The method of claim 17, further comprising
determining the sources of interference and errors by using information about other networks and sources of noise and interference in an area surrounding the communications network.

19. The method of claim 18, wherein determining an interleaving value comprises:
searching a data table for spectral information based on the inputted information; and
retrieving the required interleaving value from the data table.

20. The method of claim 17, wherein the network devices maintain measurements of network performance, and wherein the sources searching the measurements of interference and errors are determined by:
searching the measurements of network performance for sources of interference and errors by each network device; and
sharing the sources of interference and errors between the network devices.

21. The method of claim 20, wherein determining interleaving values comprises:
determining, from the sources of interference and errors, a largest interferer and error source; and
calculating the interleaving values so that the communications network is substantially immune to the largest interferer and error source.

22. The method of claim 17, wherein modifying comprises applying the determined interleaving values to the transmission.

23. The method of claim 17, wherein the communications network is a wireless communications network.

24. The method of claim 17, wherein the communications network is a wireline communications network.

25. A network device comprising:
an output port;
a transmit path coupled to the output port, containing circuitry to transmit information from the network device to another network device via the output port, the transmit path further comprising:
a first data source the first data source provides a stream of data for transmission;
a programmable interleaver having an input coupled to the first data source and an output coupled to the transmit path, the programmable interleaver able to interleave a data stream from the data source and provide an interleaved data stream;
a first programming interface coupled to the programmable interleaver the first programming interface to provide information used to program the programmable interleaver;
the network device comprising a receive path coupled to an input port, the receive path containing circuitry to receive information from another network device, the receive path further comprising:
a programmmable de-interleaver having an input coupled to the input port and an output coupled to the transmit path, the programmable de-interleaver able to de-interleave a data stream from the input port and provide a de-interleaved data stream; and
a second programming interface coupled to the programmable de-interleaver the second programming interface to provide information used to program the programmable de-interleaver.

26. The network device of claim 25, wherein the programmable interleaver comprises a software interleaver, the programmable interleaver comprising:
a first memory bank, the first memory bank containing sequence of memories, each memory containing a data bit from the data stream; and
a second memory bank, the second memory bank containing a sequence of address pointers, each address pointer containing an address of a memory in the first memory bank and an address pointer's location in the second memory a corresponding to a location of the data bit post interleaving.

27. The network device of claim 25, wherein the programmable interleaver comprises a hardware interleaver, the programmable interleaver comprising:
a first memory bank, the first memory bank containing a sequence of memories, each memory containing a data bit from the data stream;
a second memory bank, the second memory bank containing a sequence of memories, the sequence of memories to hold an interleaved sequence of data bits; and
a series of multiplexors, each multiplexer further comprising:
a plurality of inputs, wherein each input is coupled to a different memory from the first memory bank;
an output coupled to a memory in the second memory bank; and
a select line, the select line is used to select a single input from the plurality of inputs and conned the single input to the output.

28. The network device of claim 25, wherein the programmable interleaver comprises a hardware interleaver, the programmable interleaver comprising:
a first memory bank, the first memory bank containing a sequence of memories, each memory contains a data bit from the data stream;
a second memory bank, the second memory bank containing a sequence of
memories, the sequence of memories to hold an interleaved sequence of data bits; and
a crossbar switch having a plurality of inputs coupled to the first memory bank and a plurality of outputs coupled to the second memory bank, the crossbar switch containing circuitry to connect each input to a different output of the plurality of outputs.

29. The network device of claim 28, wherein the programmable inerleaver further comprises a set of select lines coupled to the crossbar switch, the set of select lines is used to select a one-to-one mapping between the inputs and the outputs.

30. The network device of claim 25, wherein the input port and the output port are antennae.

31. The network device of claim 25, wherein the input port and the output port are coupled to a wireline transmission medium.

32. The network device of claim 25, wherein the programmable interleaver is programmed according to sources of interference and errors in a network and wherein the programmable de-interleaver is programmed according to sources of interference and errors in the network.

33. The network device of claim 25, wherein the information used to program the programmable interleaver comprises information used to determine a mapping of an incoming data stream, into an interleaved data stream.

* * * * *